United States Patent [19]

Zwirner et al.

[11] Patent Number: 5,276,504

[45] Date of Patent: Jan. 4, 1994

[54] LINEAR BACKLIGHTING SYSTEM AND METHOD

[75] Inventors: Kurt Zwirner, Melrose; John Stark, Upper Falls, both of Mass.

[73] Assignee: Dolan-Jenner Industries, Inc., Woburn, Mass.

[21] Appl. No.: 862,970

[22] Filed: Apr. 3, 1992

Related U.S. Application Data

[63] Continuation of Ser. No. 444,737, Dec. 1, 1989, Pat. No. 5,102,227.

[51] Int. Cl.$^5$ .......................... G01B 11/02; F21V 7/04
[52] U.S. Cl. ..................... 356/384; 356/446; 362/31; 362/32; 362/246; 362/253
[58] Field of Search .............. 356/379-387, 241, 372, 375, 73.1; 250/227.11, 227.29, 560, 561, 227.13, 227.14, 227.28, 227.3, 227.31, 227.32; 362/26, 31, 32, 300-303; 385/116, 117

[56] References Cited

U.S. PATENT DOCUMENTS

| | | | |
|---|---|---|---|
| 3,491,245 | 1/1970 | Hardesty | 250/227.11 |
| 4,059,916 | 11/1977 | Tachihara et al. | 362/31 |
| 4,293,226 | 10/1981 | Kinoshita et al. | 250/227.28 |
| 4,561,043 | 12/1985 | Thompson | 362/32 |
| 4,576,482 | 3/1986 | Pryor | 356/376 |
| 4,597,030 | 6/1986 | Brody et al. | 362/32 |
| 4,714,983 | 12/1987 | Lang | 362/31 |
| 4,772,128 | 9/1988 | Vinarub et al. | 356/384 |
| 4,797,711 | 1/1989 | Sasada et al. | 362/32 |
| 4,820,917 | 4/1989 | Ioannou | 250/227.14 |
| 4,845,596 | 7/1989 | Mouissie | 362/32 |
| 4,911,527 | 3/1990 | Garcia et al. | 250/227.14 |
| 4,989,933 | 2/1991 | Duguay | 350/96.1 |
| 5,005,108 | 4/1991 | Pristash et al. | 362/31 |
| 5,102,227 | 4/1992 | Zwirner et al. | 356/384 |

*Primary Examiner*—Richard A. Rosenberger
*Assistant Examiner*—Hoa Q. Pham
*Attorney, Agent, or Firm*—Hamilton, Brook, Smith & Reynolds

[57] ABSTRACT

A linear lighting system includes a rod made of a material such as glass surrounded by an outer layer of cladding of lower refractive index than the glass. The rod is ground flat on one side to produce a flat rough surface with the texture oriented transverse to the longitudinal axis of the rod. Light from a light source enters the rod at one end of the rod. As the light propagates down the rod, it is scattered by the rough flat surface. Some of the scattered light strikes the rounded surface at an angle which allows it to pass through the cladding and escape the rod, thus producing uniform linear lighting emitted from the round side of the rod.

9 Claims, 10 Drawing Sheets

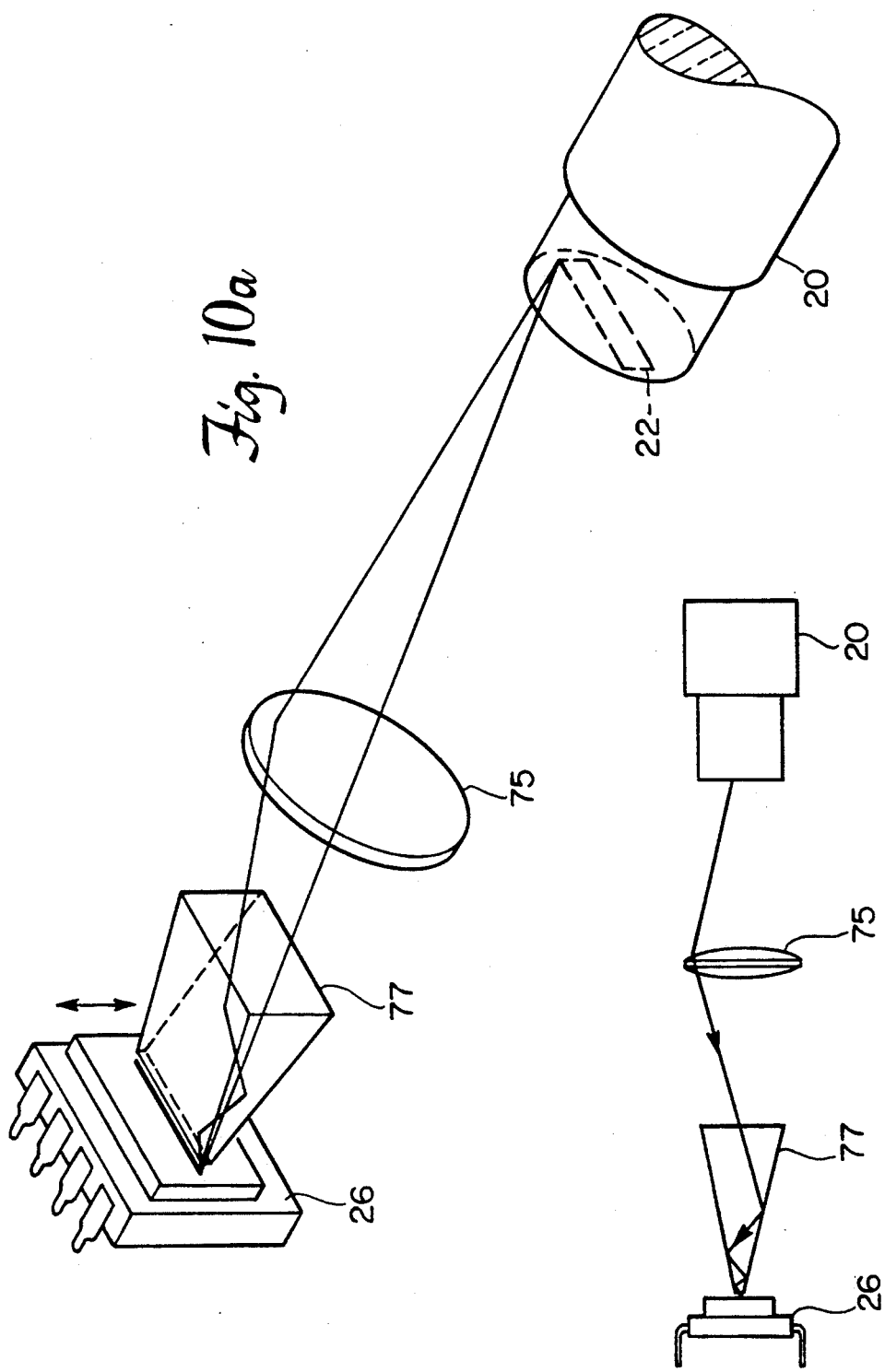

LINEAR BACKLIGHTING SYSTEM AND METHOD

This application is a continuation of application Ser. No. 07/444,737, filed Dec. 1, 1989 now U.S. Pat. No. 5,102,227.

BACKGROUND OF THE INVENTION

Vision systems have many applications including machine vision and optical measuring. Machine vision systems are systems that enable machines such as robots to view objects. These systems are particularly useful in quality control monitoring such as dimensional inspection of small parts, parts placement inspection, dimensional gauging of large parts and height measurement.

Vision systems are currently available in a number of different configurations and styles. One particularly prominent system is disclosed in U.S. Pat. No. 4,772,128 by Vinarub et al. which is assigned to Dolan-Jenner Industries, Inc. In that system, a target is viewed by means of a coherent fiber optic bundle that is comprised of a two-dimensional array of fibers. The image of the target viewed by the coherent fiber optic bundle is received at a one-dimensional linear light detector array. The slice of the image received at the light detector array is processed using electronic circuitry. The electronics provide for detection of target edges, computation of dimensions and control of the intensity and exposure time. The light source used by the system is a non-coherent light source that is collimated by a collimator.

SUMMARY OF THE INVENTION

In accordance with one embodiment of the present invention, a backlighting system for a vision system comprises a light source such as a fiber optic bundle for carrying light and a rod for receiving the light from the light source. The light source and rod are positioned so that they directly abut each other within a housing. The rod diffuses the light received from the light source so that light escapes the rod in a uniform manner. Light escaping the rod passes through an aperture in the housing. The rod is comprised of a first longitudinal surface that is curved and a second longitudinal surface that is flat. The flat longitudinal surface aids in latitudinally dispersing the light as it travels longitudinally down the rod.

This backlighting system preferably has a cover that is attached to the housing for covering the aperture. This cover not only isolates the rod and light source from the surrounding environment but also further diffuses the light as it escapes through the aperture of the housing. It is also preferred that the second flat longitudinal surface have a rough texture. This rough texture provides an added level of diffusion. To prevent light from escaping through the flat longitudinal surface, a reflective coating may be placed on the flat longitudinal surface. The rod should be positioned so that its curved longitudinal surface faces the aperture. Furthermore, the rod is preferably comprised of a glass core that is partially surrounded by a glass cladding.

The present invention also embodies a two-dimensional area backlighting system. This two-dimensional area backlighting system is comprised of a light source and a diffuser positioned near the light source. The diffuser latitudinally diffuses the light along the length of the area backlighting system. A diffusion box such as a reflective white box is also included in the area backlighting system. The diffusion box further latitudinally diffuses the light while also longitudinally diffusing the light along the width of the area backlighting system. The diffusion box is provided with a two-dimensional aperture through which light escapes to furnish the backlighting for the vision system.

The lighting source of the area backlighting system is preferably a fiber optic bundle. In particular, it is preferred that the fiber optic bundle have a flared fiber optic end that is comprised of multiple branches. This flared fiber end is positioned in the diffusion box so that the branches of the flared fiber optic extend across the width of the diffusion box. This positioning aids in dispersal of the light along a latitudinal direction. The diffuser is preferably a lenticular lens of cylindrical lens elements. Moreover, it is preferred that a holding means hold the flared end in its appropriate position. To provide maximal diffusion, the holding means is best oriented, for each branch of the flared end, at an angle relative to the diffusion box so that light traveling down the branches is encouraged to reflect off the bottom and sides of the diffusion box. This reflection aids in diffusion of the light and, thus, heightens the uniformity of the backlight. It also preferably has a cover for covering the two-dimensional aperture.

In accordance with yet another embodiment of the present invention, an apparatus provides an extended line light source for a vision system. The apparatus is comprised of a fiber optic bundle for carrying light. This fiber optic bundle terminates at a small linear aperture. A first lens that focuses the light carried over the fiber optic bundle follows the aperture. In addition, a second lens is positioned after the first lens. This second lens spreads the light that passes through the first lens in a single linear dimension corresponding to the primary dimension of the small linear aperture to produce an extended line of light. The second lens is preferably a lenticular or cylindrical lens. Moreover, it is preferred that all of the components of the apparatus be held within a single housing.

The housing is comprised of a first housing that is secured to the fiber optic bundle. This housing holds the first lens. The second housing, in contrast, holds the second lens and is secured to the first lens. The second housing, however, is rotatable relative to the first housing. The capability to rotate the second housing allows the second lens to be properly oriented relative to the small linear aperture. The proper positioning of the lenses provides a higher degree of resolution for the line light source output.

The present invention also embodies an imaging system. The imaging system is comprised of a coherent fiber optic bundle. This coherent fiber optic bundle includes an array of fibers for viewing a target. The imaging system also includes a light detector array fixed relative to a proximal face of a fiber optic bundle. The light detector array receives an image of the target from the coherent fiber optic bundle. An image directing means is located between the proximal face of the fiber optic bundle and a light detector array. The image directing means homogenizes image of the target object. The image is homogenized by either a diffusing means that diffuses the pixels of the image carried over individual fibers in a single direction or by a condensing means that condenses the pixels in a single direction. These approaches eliminate unwanted dark spots on the received image attributable to broken fibers and also eliminate non-linearities in measurements due to incoherency of the fiber optic. The light detector array may be a one-dimensional or two-dimensional array. In either case, the array is preferably comprised of charge coupled devices. Furthermore, in the preferred approach of this embodiment, the light is homogenized along columns of the coherent fiber optic bundle.

BRIEF DESCRIPTION OF THE DRAWINGS

FIGS. 10a and 10b illustrate the imaging system used to homogenize the image using a condensing means.

DETAILED DESCRIPTION OF THE PREFERRED EMBODIMENT

The preferred embodiment of the present invention concerns a vision system. The vision system of the present invention includes several features that are significant improvements over vision systems currently available in the prior art.

Figure 1:
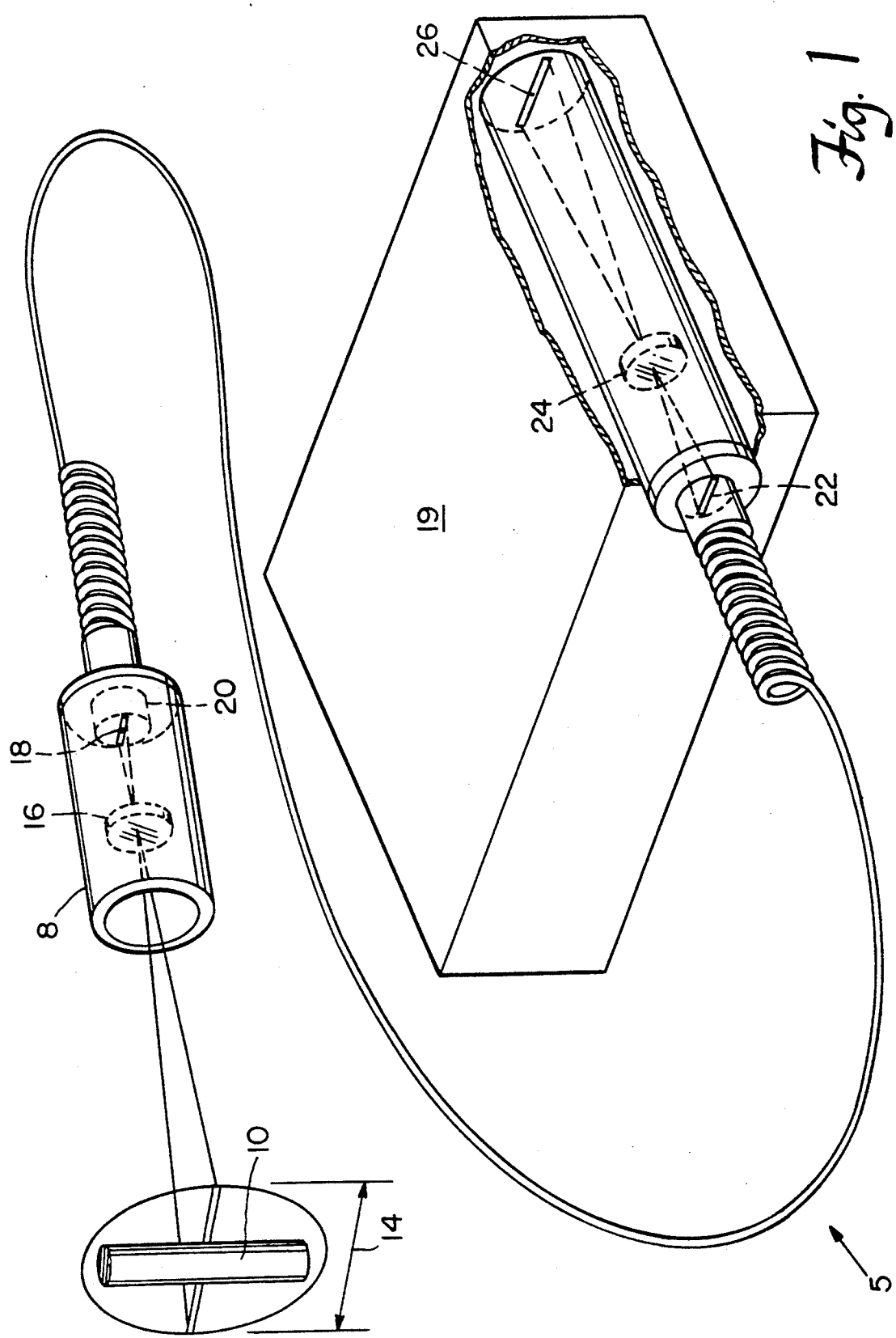
FIG. 1 shows the major components of an vision system of a preferred embodiment.

FIG. 1 depicts the major components of the vision system 5 of a preferred embodiment. Typically, in this embodiment, a target object 10 such as a pin is viewed by the vision system 5. Target objects can be seen only when they are illuminated and lie within the field of view 14 of the machine vision system 5. The image of the target object 10 is received by the machine vision system 5 via a receiving portion 8 of the system 5. The receiving portion 8 includes a lens 16 that focuses the image upon a distal aperture 18 of a coherent fiber optic bundle 20. The lens 16 is included within the receiving portion 8 only when the light that impinges upon the target is non-collimated. If the light is collimated, the lens 16 is not necessary because a clear image of the target object is received without the need of the lens 16.

Once the image is imposed upon the aperture 18 of the coherent fiber optic bundle 20, it passes via the fiber optic bundle 20 to the imaging portion 19 of the machine vision system 5. The imaging portion 19 is coupled to the coherent fiber optic bundle 20. The image received at the distal aperture 18 of the bundle 20 travels down the bundle 20 to a proximal aperture 22 located in the portion of the bundle 20 coupled to the imaging portion 19. This image passes out the proximal aperture 22 into a focusing lens 24 which focuses the image onto a light detector array 26. In this preferred embodiment, the array 26 is comprised of charge coupled devices (CCDs). The array 26 may be a one dimensional array or a two dimension array as dictated by the particular application.

Figure 2A:
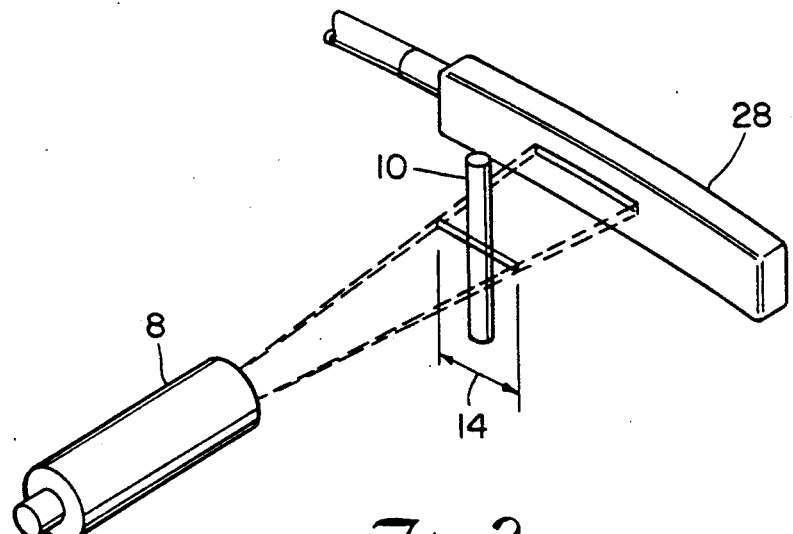
FIGS. 2a, 2b and 2c illustrate how backlighting may be used to silhouettes a target object.
Figure 2B:
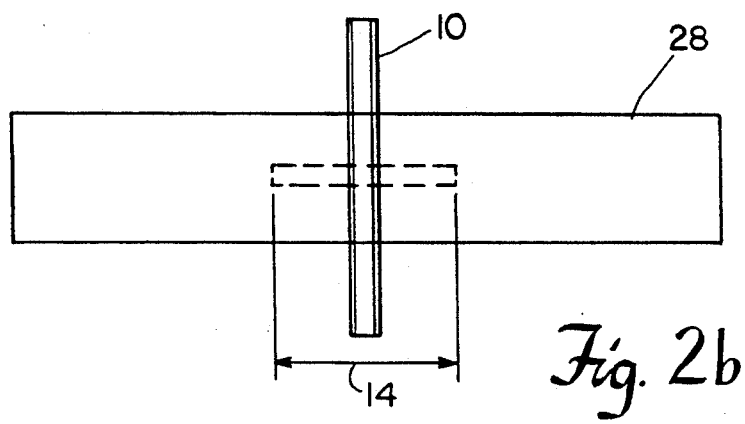

As mentioned above, the target must be illuminated in order for the target to be viewed by the vision system. FIGS. 2a and 2b illustrate how a backlight 28 may be used to illuminate a target. In FIG. 2a, a linear or one-dimensional backlight 28 is used. It is positioned behind the target object 10 so that it readily illuminates the target object 10. For the particular application depicted in FIG. 2a, it is best to position the backlight 28 so that it is directly in line with the receiving portion 8. Other applications may require different orientations.

Figure 2C:
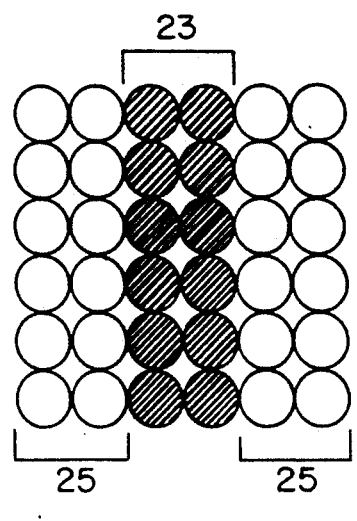

FIG. 2b illustrates how the target object 10, such as a pin, is silhouetted when a linear backlight 28 is positioned as shown in FIG. 2a. The light emitted by the backlight 28 that lies within the field of view 14 and that is not blocked by the target object 10 appears bright in the image imposed on the distal aperture 18. The target object, however, appears dark in the image and thus, is silhouetted by the bright background. The resulting image received at the distal aperture 18 of the fiber optic bundle is like that shown in FIG. 2c. The pixels 23 received by the aperture 18 that make up the portion of the image where the target blocks the light are dark, and the other pixels 25 are bright. Thus, the image of the target object 10 can be clearly distinguished.

Figure 3A:
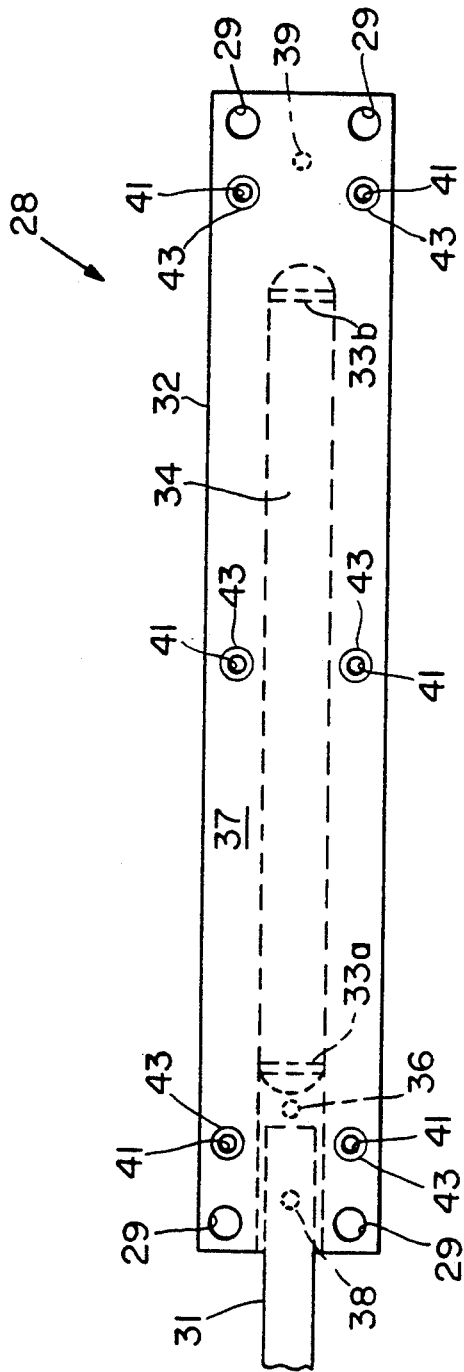
FIGS. 3a and 3b show the linear backlighting system.
Figure 3B:
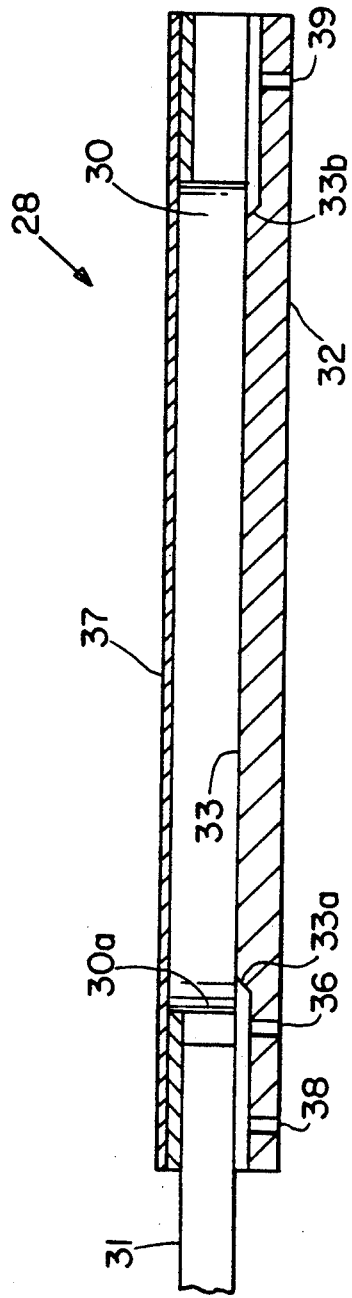

When linear backlighting (i.e. backlighting oriented primarily in a single dimension) is desirable, it is preferred that a linear backlight 28 like that shown in FIG. 3a and in FIG. 3b be used. The linear backlight 28 is comprised of a glass rod 30 disposed within a housing 32. The housing 32 includes holes 29 to pass screws to secure the backlight 28 to the rest of its environment. The glass rod 30 is preferably comprised of fiber optic cane. The cane consists of an interior of core glass surrounded by an outer layer of cladding. The cladding has a lower index of a refraction than the core glass; thus, as light propagates down the fiber optic cane it does not escape unless it exceeds a critical angle. It is preferred that this rod 30 be polished on its two ends.

The rod 30 initially has a cylindrical shape. It is subsequently ground flat on one side to produce a rod having a curved side and a flat side. The rod 30 is disposed within the housing 32 such that it lies under an aperture 34 on the top surface of the housing 32. The aperture 34 is preferably oblong and oriented primarily along the length of the rod 30. The flat side of the rod 30 rests against a flat step 33 having ends 33a and 33b. Once the rod is appropriately positioned under the aperture 34, it is set in place using set screws that passes through holes 36 and 39, respectively. The set screws lock the rod 30 in position. A fiber optic bundle 31 is placed against the one end 30a of the glass rod 30 so that the bundle 31 and rod 30 directly abut each other. The fiber optic bundle 31 is locked in place by another set screw that passes through hole 38.

The housing 32 is preferably made of metal such as anodized aluminum. There are two options with regard to anodizing the housing 32. In the first option, the entire housing 32 is initially anodized. When the anodization is complete, the slot in which the glass rod 30 fits is cut to expose the non-anodized reflective surface of the housing 32 that lies directly underneath the glass rod 30. The surface does not absorb light, as would a dark anodized surface. As a result light that errantly escapes the rod and does not pass through the aperture is not absorbed by the housing. In the second option, the housing 32 is anodized after machining. Before it is anodized, the slot is masked off so that the masked area is not anodized. As a result, the masked area retains the desired non-absorbent color.

Figure 4A:
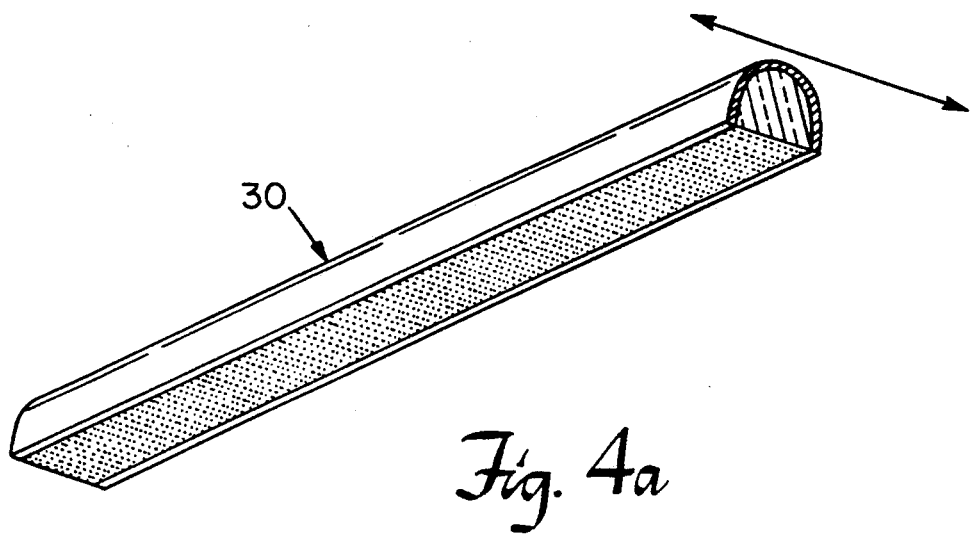
FIGS. 4a and 4b illustrate the cylindrical shaped rod of the linear backlighting system.

To operate the backlight 28, light originating from a light source is shone down the fiber optic bundle 31. The light from the fiber optic bundle 31 enters the rod 30 and travels longitudinally down the length of the rod 30. The bottom flat surface of the rod is ground to produce a rough texture (see FIG. 4a). The grain of the texture is transverse to the longitudinal axis as indicated by the arrow in FIG. 4a. The flat nature of this surface makes it likely in many instances that light reflecting off the surface will exceed the critical angle and escape via the aperture 34. The roughness, on the other hand, causes the light to reflect diffusely so that the light spreads out uniformly throughout the rod. One result of grinding the surface flat is that the grinding cuts through the outer cladding, and thus, the protective cladding that prevents light from escaping is removed. To assure reflection from the bottom surface of the rod 30, it is coated with a reflective coating such as white paint.

Figure 4B:
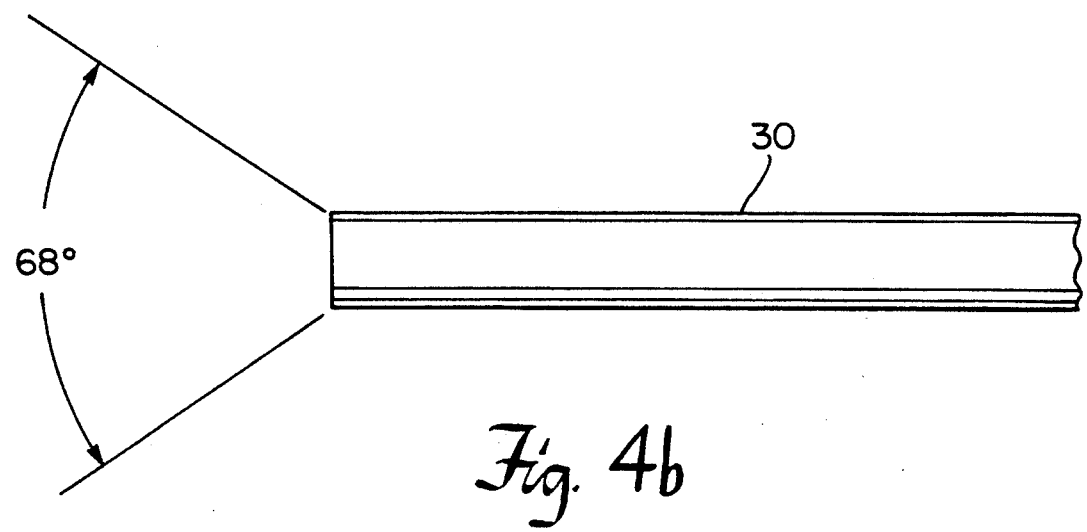

The incoming light may enter the rod at any angle within a cone of approximately 68° relative to the face of the rod (see FIG. 4b). Once inside the rod, the light reflects off the upper and lower surfaces of the rod 30. Reflection on the lower surface, as previously described, results in diffuse reflection. Some of the light that is reflected in a diffuse manner reflects at angles greater than the critical angle of the rod 30 and escapes through the curved rounded surface of the top of the glass rod 30 past the aperture 34 to the target. The cylindrical shape of the rod 30 provides several benefits over square rods that are known in the prior art. For instance, the cylindrical rods have fewer hot spots of light and greater uniformity. The cylindrical rods carry the light at an acceptable intensity for a longer distance; thus, cylindrical rods may be used that are of greater length than their square counterparts. Lastly, the cylindrical rods tend to be easier to manufacture than the square rods.

The housing 32 is preferably covered with a diffusion plate 37 comprised of a material such as acrylic. The diffusion plate 37 isolates the rod and the fiber optic bundle 31 from the external environment, and it also aids in diffusing exiting light. Holes 43 are provided within the plate and smaller holes 41 are provided within the housing 32 for screws that secure the plate 37 to the housing 32. Moreover, additional matching holes 29 are provided in the housing 32 and in the plate 37 for securing the linear backlight to its environment.

The net result of the configuration of the linear backlighting system is that a uniform diffused pattern of light is emitted through the aperture 34. The uniform linear backlighting provided by this system is ideal for many machine vision applications.

Figure 5A:
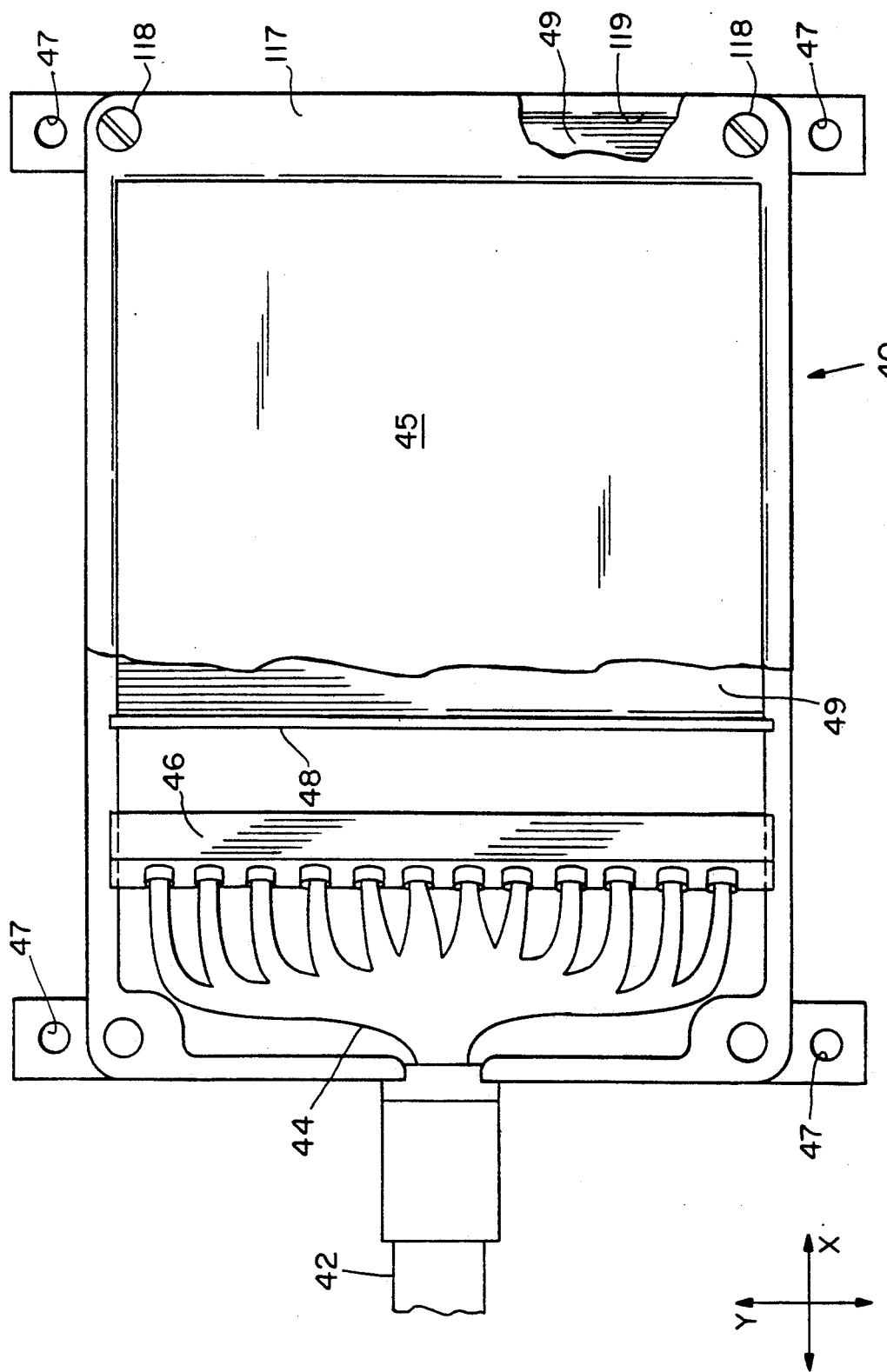
FIGS. 5a and 5b depict the area backlighting system.
Figure 5B:
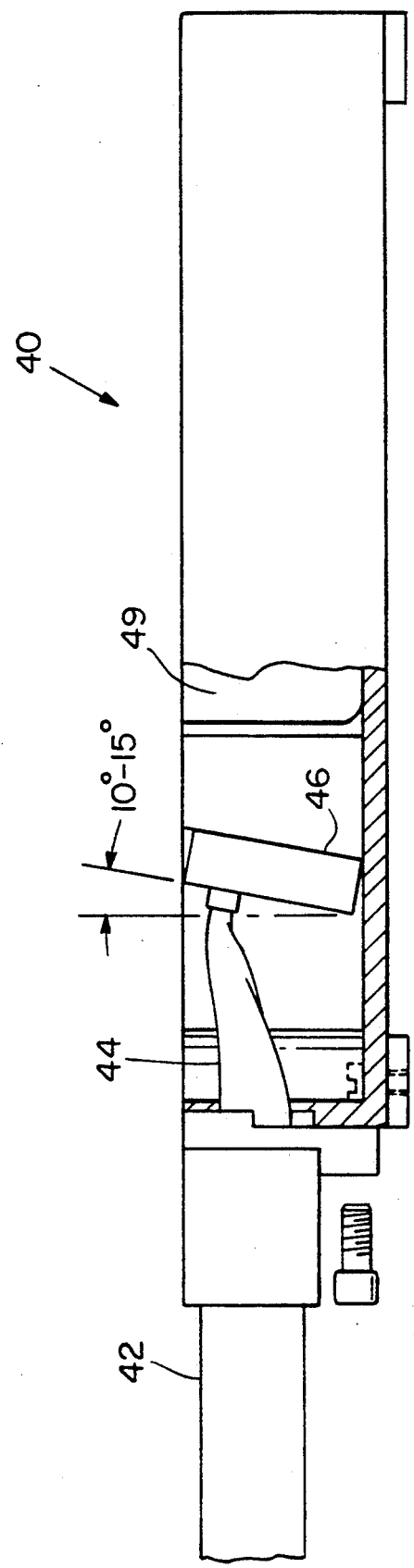

The linear backlight 28 is useful in applications that require backlighting oriented primarily in one dimension. Often times, however, it is desirable to have backlighting that is oriented in two dimensions. To facilitate such applications, a preferred embodiment of the present invention includes a two dimensional area backlight 40 such as shown in FIG. 5a from a partially exposed top view. A portion of the same backlight 40 is shown in FIG. 5b from a partially exposed side view. The area backlight 40 has an aperture 45 oriented substantially in two dimensions through which light is emitted. In the preferred approach the aperture 45 has a square shape. Incoming light is initially provided by a fiber optic bundle 42 comprised of twelve small bundles. Exactly twelve bundles need not be used; rather alternative quantities of small bundles may be used. The present invention is intended to embody implementations that use such alternative quantities of small bundles. The large bundle 42 has a flared end 44 that isolates each of the individual small bundles. Each of the small bundles are coupled to a holding apparatus 46. The small light sources are, thus, positioned along the Y direction of the holding mechanism 46 (see axis in FIG. 5a). The flared bundles are covered with a black epoxy to assure that no light escapes through the bent fibers of the bundles.

As the beams of light escape the holding mechanism 46, they pass through a lenticular lens 48. The lenticular lens 48 is comprised of a sheet having a series of consecutive cylindrical segments. The cylindrical segments are positioned so that they spread light in one direction but not in the other direction. The lenticular lens 48 is oriented so that incoming light is dispersed along the Y direction of the area backlight 40 (see axis in FIG. 5a). As such, the flared end 44 provides a limited amount of latitudinal dispersion in the Y direction, and the lenticular lens 48 serves to further latitudinally diffuse the light so that it is uniform throughout the Y direction of the area backlight 40.

The aperture 45 for the area backlight 40 is two-dimensional. Thus, it is not sufficient for the light to be diffused merely in the Y direction. It must also be longitudinally diffused in the X direction. As mentioned above, the lenticular lens 48 only diffuses the light in a single latitudinal direction. Therefore, an alternative mechanism must be used to diffuse the light in the X direction. The diffusion in the X direction is achieved by surrounding the light that passes through the lenticular lens 48 with a reflective box 49. This box 49 is coated on all sides with a reflective coating such as white paint. The reflective coating causes the light to reflect throughout the box 49 and hence, diffuse the light in the X direction as well as in the Y direction. The box 49 (denoted by shaded region) extends from after the lenticular lens 48 to an outermost edge 119. As is shown in FIG. 5b, each output of the holding apparatus is angled 15° relative to the X-Y plane so that the cone of light spreads across the longitudinal X length of the reflective box 49. The aperture 45 of the box is located in the area that follows the lenticular lens. This approach produces no appreciable hot spots over the length and width of the aperture 46.

Like the linear backlight 25, the area backlighting system 40 is provided with a number of holes. Specifically, holes 47 are provided in arms of the area backlighting system 40 for screws to secure the area backlighting system 40 to its environment. Further, matching holes 118 are provided in the main body of the area backlighting system 40 and in a diffusing plate 117 that covers the entire main body of the system for screws to secure the plate 117 to the main body. The area diffusing plate 117 like its linear counterpart serves to further diffuse exiting light as well as to isolate components of the area backlighting system 40.

Figure 6:
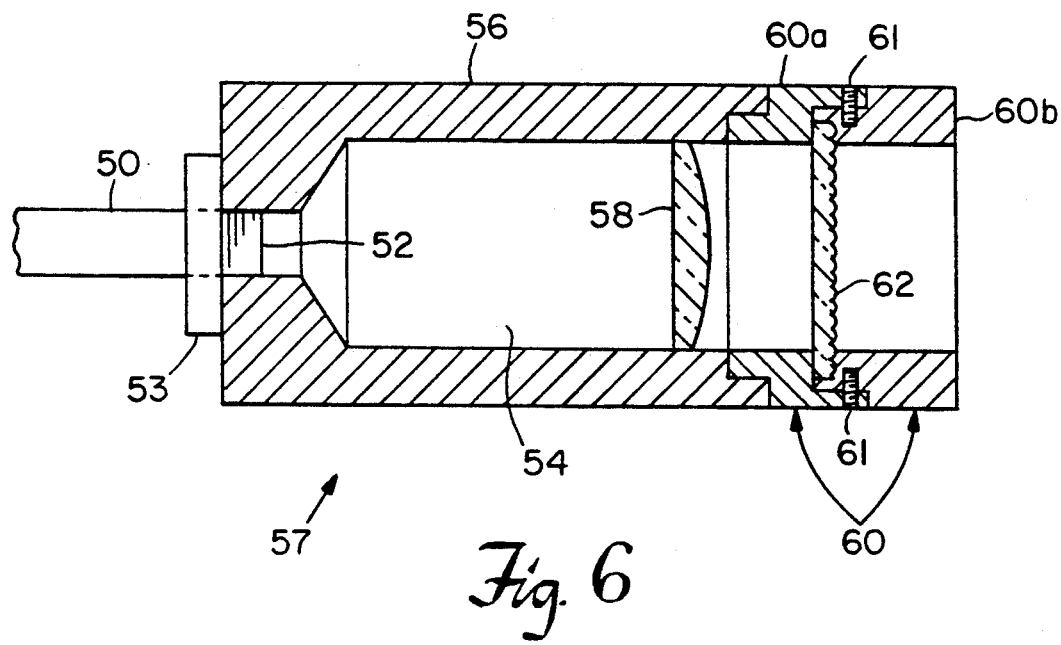
FIG. 6 shows the line light source system.

Other lighting options embodied within the present invention include providing a line light source 57 (i.e. a light source that is oriented primarily in only one direction so that it appears as a line). FIG. 6 shows the major components of the machine vision system that implements a line light source. Light is carried via a fiber optic bundle 50 to a linear aperture 52 located at the end of the fiber optic bundle 50. From there, the light passes through an opening 54 within a stationary housing 56 that is coupled to the fiber optic bundle by a ferrule 53. Disposed at the end of the opening 54 is a lens 58. This lens 58 has a long focal length and low magnification. The low magnification prevents expansion of the image in any unwanted dimensions. The light travels across the opening 54 through the lens 58.

Coupled to the stationary housing 56 is a rotational housing 60. It is referred to as a rotational housing 60 because it may be rotated through 360° with respect to the stationary housing 56. It is comprised of an adapter 60a that adapts the rotational housing 60 to the stationary housing 56, and it is also comprised of a rotatable section 60b that freely rotates. Once the rotatable section 60b is appropriately positioned, the rotatable section 60b may be fixed relative to the adapter 60b by set screws through holes 61. At the proximal face of the rotational housing 60 is a lenticular lens 62. The lens 62 is positioned so that it directly abuts the lens 58 held in the stationary stage housing 56. Due to this positioning, the light passing through the lens 58 also passes through the lenticular lens 62. The lenticular lens 62 causes the light to be dispersed in a single direction. However, to produce a high resolution line light source, it is necessary that the lenticular lens 62 be oriented properly relative to the linear aperture 52. To facilitate such orientation, the rotational housing 60 that holds the lenticular lens 62 is rotatable as noted above. Thus, this configuration takes a linear light source from the aperture 52 and extends the linear dimension without widening the line.

Figure 7:
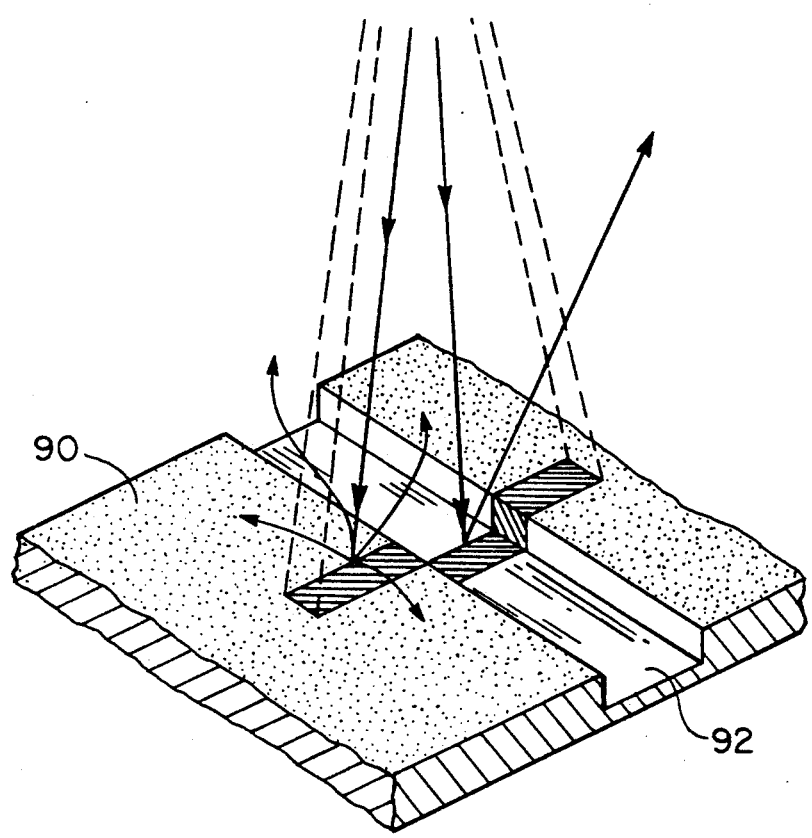
FIGS. 7 and 8 illustrate potential applications of the line light source system.

Such a line light source may be useful to take advantage of surface texture and to improve contrasts of edges of a target object. For instance, as shown in FIG. 7 a line light source may be used to differentiate between a cast surface 70 and a machined surface 72. The cast surface 70 is rough; hence, light striking it is dispersed in a diffuse manner. The machined surface 72 is smooth, and light striking it is reflected in a manner akin to a mirror. As a result, the machined surface 72 appears bright in the image relative to the cast surface 70. In the specific case shown in FIG. 7, the difference in image intensities may be used to determine the width of the machined surface 72.

Figure 8:
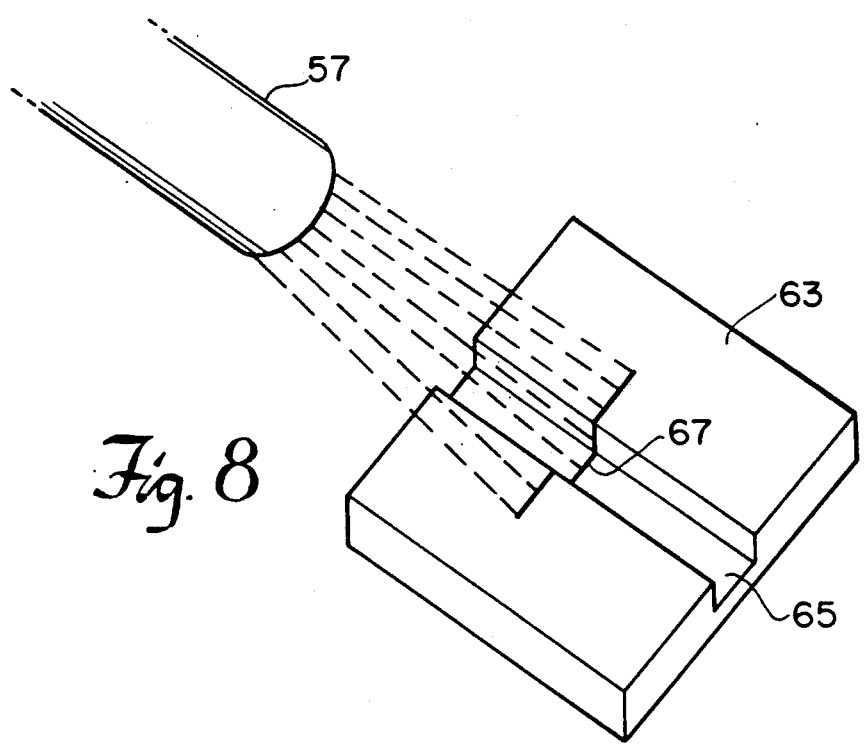

The configuration shown in FIG. 6 also has potential application in determining the depth of channels. For instance, suppose that the system is employed in an application like that shown in FIG. 8. In that system, a line light source 57 is directed at an angle to a substrate 63 having a channel 65. The jog 67 in the resulting image may be analyzed to determine the depth of the channel presuming that the angle of the light source 57 relative to the substrate 63 is known.

The majority of the discussion thus far has focused on lighting systems. Little has been said of the imaging portion of the vision system. A recurring problem with current imaging portions of vision systems arises when one of the optical fibers in a fiber optic bundle breaks. If a fiber is broken, the pixel that the fiber represents is dark because light is not transmitted down the broken fiber. Unfortunately, each CCD in an imaging array 26 typically receives most of its light exclusively from a given fiber. Thus, if the fiber for a specified CCD is broken, the pixel is not forwarded to the CCD array 26. Furthermore, certain non-linearities may be introduced in to the image as a result of the positioning of the fibers relative to each other.

Figure 9A:
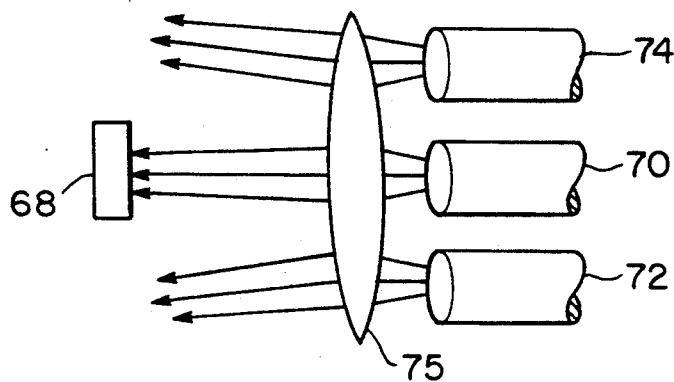
FIGS. 9a, 9b and 9c illustrate the imaging system used to homogenize the image using a diffusing means.
Figure 9B:
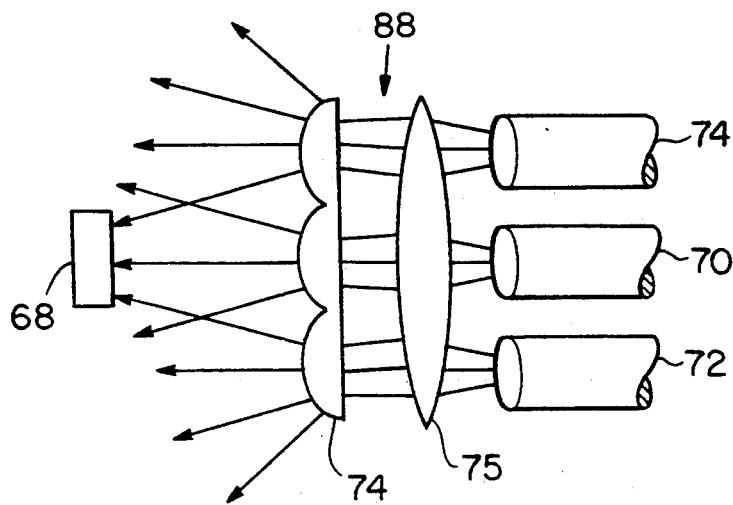
Figure 9C:
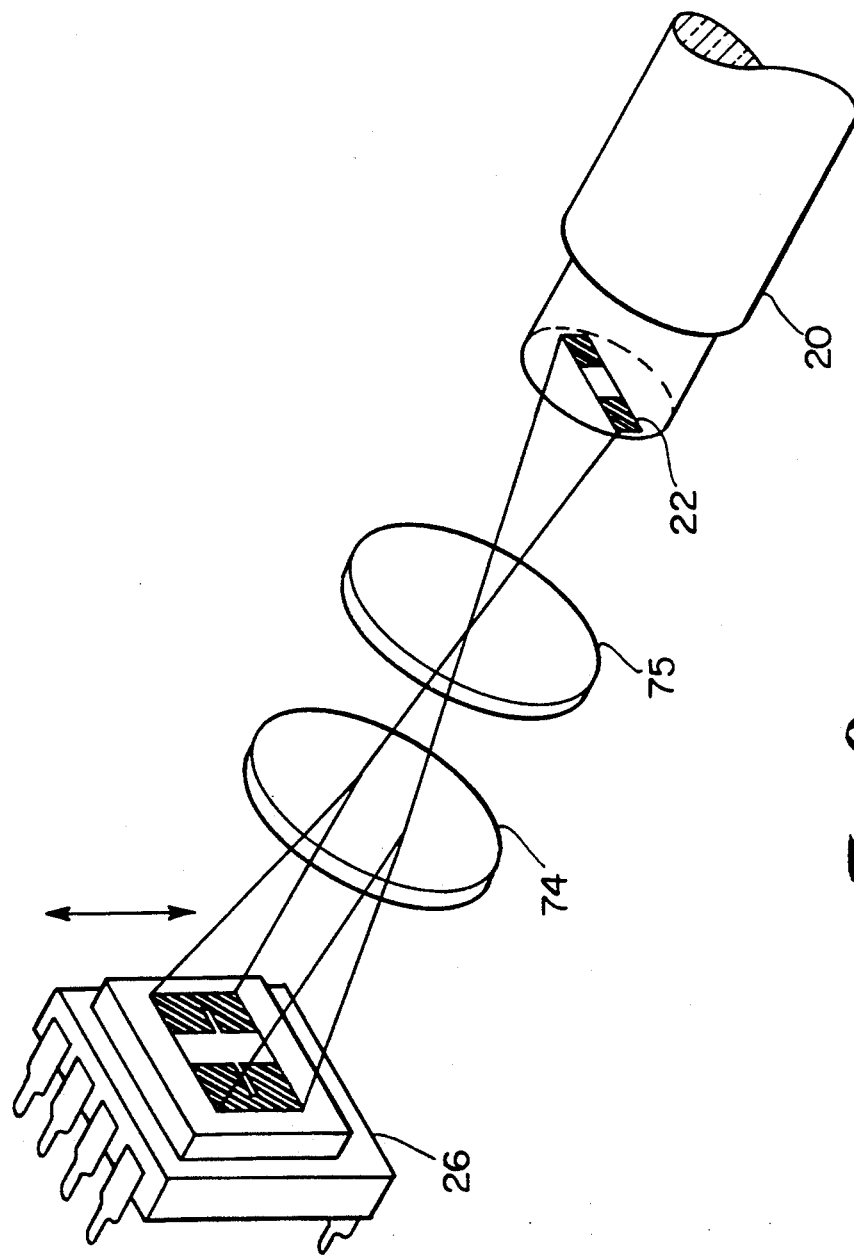

One solution to the problems of broken fibers and non-linearities is to diffuse the columns of the coherent fiber optic bundle so that they are more likely to impinge upon the target CCD in the row of charge coupled devices 26. To understand why this approach overcomes the stated problems, it is necessary to first examine the prior art systems. FIG. 9a shows a portion of a typical system known in the prior art. Note that the primary contributer to CCD 68 is fiber 70. Fibers 72 and 74 contribute little. Thus, if fiber 70 is broken, the image pixel at the CCD 68 is dark. Moreover, any non-linearity in fiber 70 is passed onto the CCD 68. FIG. 9b illustrates the alternative approach taken by a preferred embodiment of the present invention. A lenticular lens 74 is positioned at the aperture of the coherent fiber optic bundle so that it is positioned directly in front of fibers 70, 72 and 74. The pixels for this column 68 of optical fibers 70, 72 and 74 are forwarded in parallel to the lenticular lens 74. This lens 74 brings about diffusion of the column of optical fibers (if the optical fibers are arranged in columns) so that it is more likely that at least one of the fibers will shine light that impinges upon the corresponding charge coupled device 70. It is also more likely that any non-linearities will be removed. Note that by using the lenticular lens 74, the system makes all three fibers 74 contribute to the CCD element 68. The lenticular lens 64 is oriented so that all of the columns are diffused similarly. In systems where the fibers are not organized in columns, the diffusing may occur along lines different from columns. The full view of the diffusing approach of the present invention is shown in FIG. 9c.

Another solution to the problems of broken fibers and non-linearities adopted by the present invention is to use a condensing means such as a prism condenser 77 (FIGS. 10a and 10b). In accordance with this approach, the light from several pixels yield a homogenized image by focusing all of the pixels in a column or other organization (as dictated by the fiber configuration) to a single CCD element. Specifically, the image is carried over a coherent fiber optic bundle 20 to an aperture 22. The image exits the aperture 22 and passes through a relay lens 75 such as described above in the diffusion approach. A prism condenser 77 is positioned after the relay lens 75 so that as light exits the relay lens 75 it enters the prism condenser 77. The condenser 77 focuses all of the pixels in a column onto a single CCD in the CCD array 26. As a result, all of the pixels in a column contribute to the CCD and thus, the effect of a broken fiber or non-linearities is minimized.

While the invention has been particularly shown and described with reference to preferred embodiments thereof, it will be understood by those skilled in the art that various changes in form and detail may be made without departing from the spirit and scope of the invention as defined in the appended claims.

We claim:

1. A linear lighting system for providing lighting oriented primarily in a single dimension comprising:
 a) a light source for providing light;
 b) a rod for receiving light from the light source, wherein said rod comprises:
  a core through which the light propagates;
  a curved first longitudinal surface;
  a cladding on the curved first surface; and
  a flat second longitudinal surface having a rough texture with a grain oriented transverse to a longitudinal axis of the rod, said flat surface scattering the light as it travels longitudinally through the rod such that some of the scattered light passes through the cladding and is emitted from the rod; and
 c) a housing for holding secure the light source relative to the rod, said housing having a linear aperture through which light emitted from the rod may escape to provide linear lighting oriented primarily in a single dimension.

2. A lighting system as recited in claim 1 wherein an exterior of the flat second longitudinal surface of the rod is coated with a reflective coating to prevent light from escaping via the flat second longitudinal surface.

3. A lighting system as recited in claim 1 wherein the rod is positioned so that its curved longitudinal surface faces the aperture.

4. A lighting system as recited in claim 1 wherein the rod and the cladding are glass.

5. A lighting system as recited in claim 1 further comprising a cover that is attached to the housing for covering the aperture of the housing.

6. A lighting system as recited in claim 5 wherein the cover diffuses light that passes through said cover.

7. A lighting system as recited in claim 1 wherein the light source is a fiber optic bundle.

8. A method of providing linear lighting oriented primarily in a single dimension comprising the steps of:
a) providing a rod having a core, a curved first longitudinal surface covered with a cladding and a flat second longitudinal surface for scattering light, said flat second longitudinal surface having a rough texture with grain oriented transverse to a longitudinal axis of the rod;
b) positioning a light source at an end of the rod; and
c) transmitting light with the light source to the rod so that the light travels through the rod longitudinally while being scattered by the flat longitudinal surface, some of said light escaping the rod through the cladding on the curved surface to provide lighting oriented primarily in a single linear dimension.

9. The method of claim 8 further comprising backlighting a target with the light escaping from the rod in a machine vision system.

* * * * *